US011365716B2

(12) United States Patent
Sun

(10) Patent No.: US 11,365,716 B2
(45) Date of Patent: Jun. 21, 2022

(54) CONTROL METHOD AND DEVICE FOR AVOIDING RUN-AWAY AND WIND TURBINE

(71) Applicant: BEIJING GOLDWIND SCIENCE & CREATION WINDPOWER EQUIPMENT CO., LTD., Beijing (CN)

(72) Inventor: Changliang Sun, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 377 days.

(21) Appl. No.: 16/471,652

(22) PCT Filed: Jul. 11, 2018

(86) PCT No.: PCT/CN2018/095302
§ 371 (c)(1),
(2) Date: Jun. 20, 2019

(87) PCT Pub. No.: WO2019/165744
PCT Pub. Date: Sep. 6, 2019

(65) Prior Publication Data
US 2021/0246873 A1 Aug. 12, 2021

(30) Foreign Application Priority Data
Mar. 1, 2018 (CN) .......................... 201810171876.0

(51) Int. Cl.
*F03D 7/02* (2006.01)
*F03D 17/00* (2016.01)
*F03D 7/04* (2006.01)

(52) U.S. Cl.
CPC ......... *F03D 7/0236* (2013.01); *F03D 7/0204* (2013.01); *F03D 7/024* (2013.01);
(Continued)

(58) Field of Classification Search
CPC .... F03D 7/0212; F03D 7/0204; F03D 7/0224; F03D 7/024; F03D 7/0236; F03D 7/042;
(Continued)

(56) References Cited

U.S. PATENT DOCUMENTS 5,278,773 A * 1/1994 Cousineau .............. F03D 7/047
700/287
6,945,752 B1 * 9/2005 Wobben ................ F03D 7/0204
416/170 R
(Continued)

FOREIGN PATENT DOCUMENTS

CN 102619688 A 8/2012
CN 102828909 A 12/2012
(Continued)

OTHER PUBLICATIONS

English Machine Translation of CN 10957820 A, Apr. 18, 2022.*
(Continued)

*Primary Examiner* — Christopher Verdier

(57) ABSTRACT

This application provides a control method and device for avoiding run-away, and a wind turbine. The method may include: determining whether a brake system of the wind turbine has failed; if the brake system has failed, calculating an initial crosswind position based on a current wind direction angle, and enabling a yaw system of the wind turbine to perform a crosswind operation based on the initial crosswind position; performing a long-period and short-period filter processing on wind direction data acquired during a crosswind process to obtain an average and instantaneous wind direction angle respectively; determining whether a wind direction has a sudden change based on the average and instantaneous wind direction angle; and if the wind direction has a sudden change, calculating a new crosswind position based on the average wind direction angle, and enabling the
(Continued)

yaw system to perform a crosswind operation based on the new crosswind position.

12 Claims, 4 Drawing Sheets

(52) U.S. Cl.
CPC .......... *F03D 7/0212* (2013.01); *F03D 7/0244* (2013.01); *F03D 7/0264* (2013.01); *F03D 7/042* (2013.01); *F03D 17/00* (2016.05); *F05B 2270/30* (2013.01); *F05B 2270/321* (2013.01); *F05B 2270/329* (2013.01)

(58) Field of Classification Search
CPC .......... F03D 7/043; F03D 7/045; F03D 17/00; F03D 7/0264; F03D 7/0268; F03D 7/0244; F03D 7/0248; F05B 2270/321; F05B 2270/30; F05B 2270/326; F05B 2270/328; F05B 2270/329; F05B 2270/327
See application file for complete search history.

(56) References Cited

U.S. PATENT DOCUMENTS

| | | | | |
|---|---|---|---|---|
| 7,347,667 | B2* | 3/2008 | Wobben | F03D 13/25 416/1 |
| 7,939,955 | B2* | 5/2011 | Steiner | F03D 7/0244 290/44 |
| 8,043,055 | B2* | 10/2011 | Matsuo | F03D 7/0204 416/9 |
| 8,100,628 | B2* | 1/2012 | Frese | F03D 7/0212 415/4.3 |
| 8,450,867 | B2* | 5/2013 | Fukami | F03D 7/042 290/44 |
| 9,062,653 | B2* | 6/2015 | Brath | F03D 7/042 |
| 10,364,799 | B1* | 7/2019 | Roark | G05B 19/05 |
| 10,662,925 | B2* | 5/2020 | Yin | F03D 17/00 |
| 2004/0081551 | A1* | 4/2004 | Wobben | F03D 7/0224 415/4.1 |
| 2006/0153672 | A1 | 7/2006 | Davis | |
| 2006/0275121 | A1* | 12/2006 | Merswolke | F03D 9/28 416/132 B |
| 2009/0081041 | A1 | 3/2009 | Frese et al. | |
| 2010/0123314 | A1 | 5/2010 | Menke | |
| 2010/0209246 | A1 | 8/2010 | Migliori | |
| 2011/0187107 | A1* | 8/2011 | Toyohara | F03D 7/0244 290/44 |
| 2014/0035285 | A1 | 2/2014 | Creaby et al. | |
| 2015/0252783 | A1* | 9/2015 | Eusterbarkey | F03D 7/0268 415/1 |
| 2020/0018290 | A1* | 1/2020 | Egedal | G01C 9/06 |

FOREIGN PATENT DOCUMENTS

| | | |
|---|---|---|
| CN | 103225586 A | 7/2013 |
| CN | 104179636 A | 12/2014 |
| CN | 104314759 A | 1/2015 |
| CN | 205977543 U | 2/2017 |
| CN | 107514337 A | 12/2017 |
| CN | 107620670 A | 1/2018 |
| CN | 107701372 A | 2/2018 |
| EP | 2860392 A1 | 4/2015 |
| JP | 2008309097 A | 12/2008 |
| JP | 2011-127551 A | 6/2011 |
| JP | 2016223391 A | 12/2016 |
| KR | 101346275 B1 | 1/2014 |
| WO | 2010/130057 A2 | 11/2010 |

OTHER PUBLICATIONS

First Indian Office Action dated Dec. 31, 2020; Appln. No. 201917024424.
Extended European Search Report dated Nov. 13, 2020; Appln. No. 18887198.2.
Australian Examination Report No. 1 dated May 29, 2020; Appln. No. 2018386361.
International Search Report and Written Opinion dated Nov. 16, 2018; PCT/CN2018/095302.
First Chinese Office Action dated Mar. 4, 2019; Appln. No. 201810171876.0.

* cited by examiner

CONTROL METHOD AND DEVICE FOR AVOIDING RUN-AWAY AND WIND TURBINE

CROSS-REFERENCE TO RELATED APPLICATION

This application is a National Stage of International Application No. PCT/CN2018/095302, filed Jul. 11, 2018, which claims priority to Chinese Patent Application No. 201810171876.0, filed Mar. 1, 2018, both of which are hereby incorporated by reference in their entireties.

FIELD

The present disclosure relates to the technology field of wind power generation, and in particular, to a control method and device for avoiding run-away, and a wind turbine.

BACKGROUND

In order to protect the safe operation of a wind turbine, when the wind turbine fails, it is necessary to perform an emergency shutdown processing (namely, emergency braking) to the wind turbine using a brake system. At present, brake schemes for the brake system mainly include a pneumatic brake scheme, a mechanical brake scheme or a combination of both. Among them, the pneumatic brake scheme is applied to a wind turbine with a pitch system for blades, wherein a wind power captured by the blades is minimized by independently driving each blade to reach a feathering position. The mechanical brake scheme acts on a transmission mechanism of an impeller, wherein the impeller is forced to brake completely by utilizing a high mechanical friction damping effect of a mechanical brake device (for example, a brake disc).

However, taking into account uncertainties such as equipment reliability and environmental adaptability, the brake system still has a possibility of overall failure. After the overall failure of the brake system, rotating speed of the wind turbine cannot be effectively controlled, and eventually a run-away failure will occur. A run-away failure can easily cause accidents such as producing fire by friction of a brake disc, causing serious damage to the wind turbine.

SUMMARY

Embodiments of the present disclosure provide a control method and device for avoiding run-away, and a wind turbine.

According to a first aspect of embodiments of the present disclosure, there is provided a control method for avoiding a wind turbine run-away including: determining whether a brake system of the wind turbine has failed or not; if the brake system has failed, calculating an initial crosswind position based on a current wind direction angle, and enabling a yaw system of the wind turbine to perform a crosswind operation based on the initial crosswind position; performing a long-period filter processing on wind direction data acquired during a crosswind process to obtain an average wind direction angle, and performing a short-period filter processing on the wind direction data to obtain an instantaneous wind direction angle; determining whether a wind direction has a sudden change or not based on the average wind direction angle and the instantaneous wind direction angle; and if the wind direction has a sudden change, calculating a new crosswind position based on the average wind direction angle, and enabling the yaw system to perform a crosswind operation based on the new crosswind position.

According to a second aspect of embodiments of the present disclosure, there is provided a control device for avoiding a wind turbine run-away including: a first determination module configured to determine whether a brake system of the wind turbine has failed or not; a first execution module configured to: if the brake system has failed, calculate an initial crosswind position based on a current wind direction angle, and enable a yaw system of the wind turbine to perform a crosswind operation based on the initial crosswind position; a calculation module configured to: perform a long-period filter processing on wind direction data acquired during a crosswind process to obtain an average wind direction angle, and perform a short-period filter processing on the wind direction data to obtain an instantaneous wind direction angle; a second determination module configured to determine whether a wind direction has a sudden change or not based on the average wind direction angle and the instantaneous wind direction angle; and a second execution module configured to: if the wind direction has a sudden change, calculate a new crosswind position based on the average wind direction angle, and enable the yaw system to perform a crosswind operation based on the new crosswind position.

According to a third aspect of embodiments of the present disclosure, there is provided a wind turbine including the control device for avoiding a wind turbine run-away as described above.

DETAILED DESCRIPTION

Features and exemplary embodiments of various aspects of the present disclosure will be described in detail below. In the following detailed description, numerous specific details are set forth in order to provide a comprehensive understanding of present disclosure.

Embodiments of the present disclosure provide a control method and device for avoiding run-away, and a wind turbine. By adopting the technical solution in embodiments of the present disclosure, after the overall failure of a brake system of the wind turbine, a shutdown operation of the wind turbine can be realized. That is, this technical solution can be used as a further defense after the brake system fails, thereby avoiding the occurrence of a run-away failure.

In general, a yaw system is provided in a wind turbine. Depending on an implementation purpose, the yaw system may perform a windward operation and a crosswind operation.

When the yaw system performs the windward operation, a rotation plane of an impeller is adjusted to be perpendicular to a wind direction, so that the impeller may capture maximized wind energy.

When the yaw system performs the crosswind operation, the rotation plane of the impeller is adjusted to be parallel with the wind direction, that is, an angle between a nacelle direction and the wind direction is adjusted to nearly 90°, so that the wind energy that the impeller can capture is reduced, thereby reducing a rotating speed of the wind turbine. When the rotation plane of the impeller is completely parallel with the wind direction, the rotating speed of the wind turbine is reduced to 0, so as to achieve the purpose of shutting down the wind turbine.

With this principle, after the overall failure of the brake system of the wind turbine, the rotation plane of the impeller is adjusted to be completely parallel with the wind direction by triggering a crosswind function of the yaw system, so as to achieve the purpose of reducing the rotating speed of the wind turbine and avoiding a run-away failure.

Figure 1:
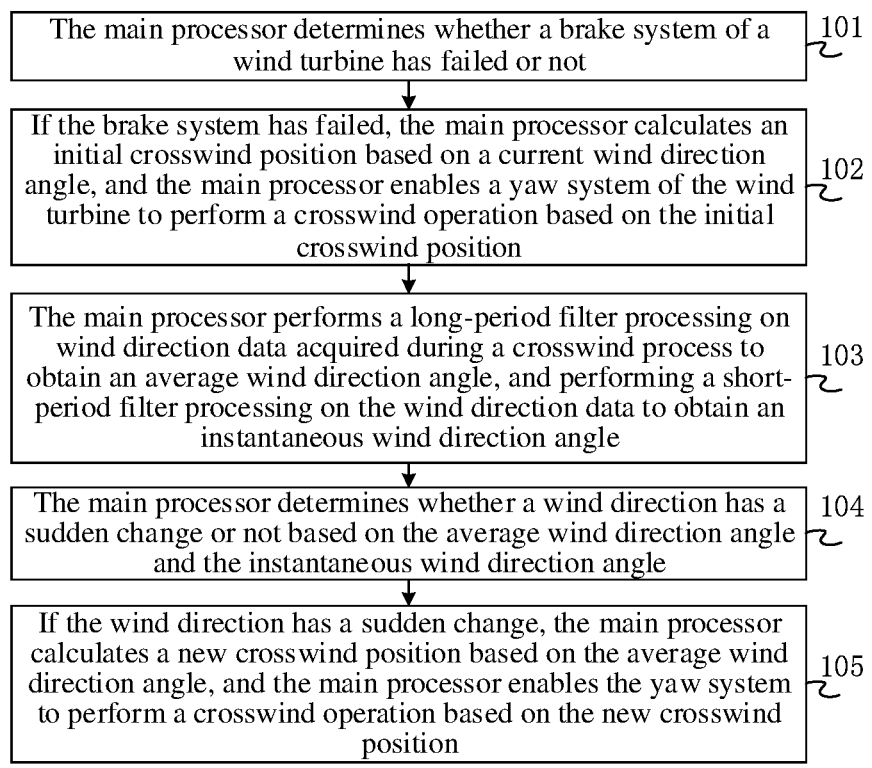
FIG. 1 is a schematic flow chart of a control method for avoiding a wind turbine run-away according to an embodiment of the present disclosure.

FIG. 1 is a schematic flow chart of a control method for avoiding a wind turbine run-away according to an embodiment of the present disclosure. As shown in FIG. 1, the control method for avoiding a wind turbine run-away may include steps 101 to 105.

In step 101, whether a brake system of the wind turbine has failed or not is determined.

In an alternative embodiment, whether the brake system of the wind turbine has failed or not is determined by determining whether the brake system brakes at least two blades to a corresponding predetermined position within a first predetermined time period t1 after receiving a shutdown instruction. It is determined that the brake system has failed, if the brake system fails to brake the at least two blades to the corresponding predetermined position within the first predetermined time period t1 after receiving the shutdown instruction.

The predetermined position may refer to a variable-pitch brake position, and variable-pitch braking may refer to perform a feathering operation along a plane parallel with a plane of a wind wheel to adjust a position of a blade from a windward surface to a position where an angle between the position and the plane of the wind wheel is 90°, so as to reduce the ability of capturing wind energy.

In an alternative embodiment, whether the brake system of the wind turbine has failed or not may also be determined by determining whether the brake system reduces a rotating speed of the wind turbine to a predetermined rotating speed within a second predetermined time period t2 after receiving the shutdown instruction. It is determined that the brake system has failed, if the brake system fails to reduce the rotating speed of the wind turbine to the predetermined rotating speed within the second predetermined time period t2 after receiving the shutdown instruction.

It should be noted that, since a position after braking and a rotating speed after braking are two independent indicators, the above methods of determining whether the brake system has failed or not based on a predetermined position and a predetermined rotating speed is performed separately. It is determined that the brake system has failed as long as any one of the conditions is met.

In step 102, if the brake system has failed, an initial crosswind position is calculated based on a current wind direction angle, and a yaw system of the wind turbine is enabled to perform a crosswind operation based on the initial crosswind position.

A crosswind position is a relative concept, and is determined based on the wind direction, that is, the crosswind position may change as the wind direction changes.

Figure 2:
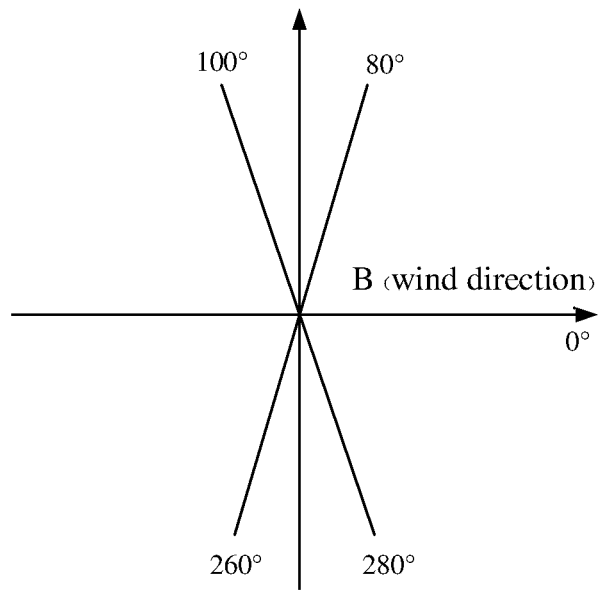
FIG. 2 is a schematic diagram of a Cartesian coordinate system in which a wind direction is reference 0° according to an embodiment of the present disclosure.

FIG. 2 is a schematic diagram of a Cartesian coordinate system in which a wind direction is reference 0° according to an embodiment of the present disclosure, wherein the wind direction is represented by B.

In an alternative embodiment, an angle range of [80°, 100°] and [260°, 280°] with respect to the wind direction B is used as the crosswind position range defined by the current wind direction B, even if the angle between the nacelle direction and the wind direction B is within [80°, 100°] and [260°, 280°].

In an alternative embodiment, the crosswind position may also be obtained based on a method of simulating a running load of the impeller.

In step 103, a long-period filter processing is performed on wind direction data acquired during a crosswind process to obtain an average wind direction angle, and a short-period filter processing is performed on the wind direction data to obtain an instantaneous wind direction angle.

The long-period filtering processing is suitable for yawing in a case of a relatively stable wind direction. For example, the long-period filter processing is performed on the acquired wind direction data based on a weighting strategy of 30 s.

The short-period filtering processing is used for a sudden change detection in the wind direction. For example, the short-period filter processing is performed on the acquired wind direction data based on a weighting strategy of 5 s. Weighting-strategy based filter processing methods may refer to the prior art, and details will not be described herein.

In step 104, whether the wind direction has a sudden change or not is determined based on the average wind direction angle and the instantaneous wind direction angle.

In an alternative embodiment, a difference between the average wind direction angle and the instantaneous wind direction angle is calculated. It is determined that the wind direction has a sudden change if the difference is greater than a preset threshold, and it is determined that the wind direction is relatively stable if the difference is not greater than the preset threshold.

In an alternative embodiment, the average wind direction angle or the instantaneous wind direction angle may also be optimized (for example, by multiplying by some constants or performing some common data processing) based on an actual situation, so that the calculated average wind direction angle and instantaneous wind direction angle is used to accurately determine a sudden change in the wind direction.

In step 105, if the wind direction has a sudden change, a new crosswind position is calculated based on the average wind direction angle, and the yaw system is enabled to perform a crosswind operation based on the new crosswind position.

According to an embodiment of the present disclosure, in order to avoid the occurrence of a run-away failure, whether a brake system of a wind turbine has failed or not is determined first. If the braking system has failed, an initial crosswind position is calculated based on a current wind direction angle, so that a yaw system of the wind turbine may perform a crosswind operation based on the initial crosswind position. Since the captured wind energy can be reduced after performing the crosswind operation, and thus rotating speed of the wind turbine can be reduced, therefore occurrence of a run-away failure can be avoided.

In addition, considering the wind direction is constantly changing during a crosswind process, it is also possible to perform a long-period filter processing on wind direction data acquired during the crosswind process to obtain an average wind direction angle, and to perform a short-period filter processing on the wind direction data to obtain an instantaneous wind direction angle. Then whether a wind direction has a sudden change or not is determined based on the average wind direction angle and the instantaneous wind direction angle. If the wind direction has a sudden change, an updated crosswind position is calculated based on the average wind direction angle, and the yaw system is enabled to perform a crosswind operation based on the updated crosswind position. In this way, the crosswind operation can be kept consistent with the wind direction. For example, when the wind direction changes greatly, the crosswind operation of the yaw system can be adjusted in time to improve the wind direction response rate and environmental adaptability of the yaw system.

In addition, the control method for avoiding a wind turbine run-away in the embodiments of the present disclosure can actively determine whether the brake system of the wind turbine has failed, and can automatically enter into a crosswind process based on the determination result. Therefore, compared to triggering the crosswind operation of the yaw system artificially, on one hand, the control method for avoiding a wind turbine run-away has advantages of high timeliness and high accuracy. On the other hand, it can avoid occupational health risks to a maintenance personnel, especially being capable of performing automatic nighttime maintenance in place of a human. As such, it is ensured that a crosswind function is complete on a long-term basis, thereby preventing a crosswind failure caused by factors such as twisted cables, slow changes in the wind direction and sudden changes in the wind direction.

In addition, since the control method for avoiding a wind turbine run-away in embodiments of the present disclosure does not need to add a new hardware device, and may adopt an implementation manner of a software control strategy, and thus the method has advantages of low cost and being easy to popularize.

Further, considering that a cable connecting a nacelle and a bottom of a tower is disposed in a nacelle cabinet of the wind turbine, the cable may twist with the yaw system relative to its straight state, for example, one or more turns. Therefore, the yaw system should also meet a risk avoidance requirement for a twisted cable when performing a crosswind operation.

In an alternative embodiment, when performing a crosswind operation of the yaw system, an unwinding direction of the cable may also be acquired, and the yaw system is enabled to perform the crosswind operation along the unwinding direction to adjust the nacelle direction to the initial crosswind position, to reserve more twistable angles for the cable during a continuous crosswind process.

As an example, if a twist direction of the cable is clockwise, then the unwinding direction should be counter-clockwise, and if the twist direction of the cable is counter-clockwise, then the unwinding direction should be clockwise.

Figure 3:
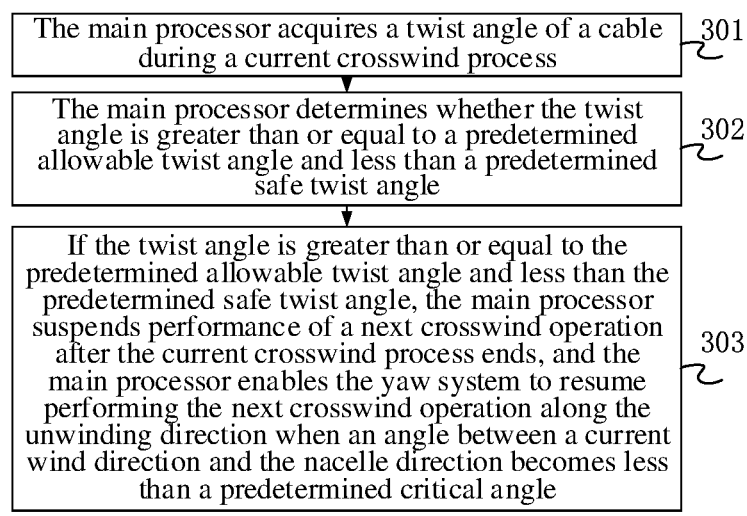
FIG. 3 is a schematic flow chart of a control method for avoiding a wind turbine run-away according to another embodiment of the present disclosure.

FIG. 3 is a schematic flow chart of a control method for avoiding a wind turbine run-away according to another embodiment of the present disclosure. As shown in FIG. 3, the control method for avoiding a wind turbine run-away may further include steps 301 to 305, for protecting a cable in a case where the yaw system continuously performs a crosswind operation, so as to avoid a wind turbine fault caused by an over-limit of a twist angle of the cable.

In step 301, the twist angle of the cable is acquired during a current crosswind process.

In step 302, whether the twist angle is greater than or equal to a predetermined allowable twist angle and less than a predetermined safe twist angle is determined.

In step 303, if the twist angle is greater than or equal to the predetermined allowable twist angle and less than the predetermined safe twist angle, performance of a next crosswind operation is suspended after the current crosswind process ends, and the yaw system is enabled to resume performing the next crosswind operation along the unwinding direction of the cable when an angle between a current wind direction and the nacelle direction becomes less than a predetermined critical angle.

Each crosswind position may correspond to one crosswind operation. If the twist angle is greater than or equal to the predetermined allowable twist angle and less than the predetermined safe twist angle, it may indicate that after performing a crosswind operation by the yaw system, the allowable twist angle of the cable has been reached, but the safe twist angle of the cable (i.e., a twisted cable protection value which is set by a safety system of the wind turbine) has not been exceeded.

Herein, the twist angle of the cable is an absolute concept. A position wherein the cable is in a straight state is considered as reference 0°, and the position of the reference 0° is determined by a lifting process of the wind turbine. In one example, the predetermined allowable twist angle is set to 800°, and the predetermined safe twist angle is set to 900°. Those skilled in the art may set a suitable predetermined allowable twist angle and a predetermined safe twist angle based on an actual situation, and there is no limit herein in this aspect.

In an alternative embodiment, an angle between the wind direction and the nacelle direction when the rotating speed of the wind turbine is accelerating is considered as a predetermined critical angle. Since when the angle between the current wind direction and the nacelle direction is less than the predetermined critical angle, the impeller of the wind turbine is in a windward state, and thus the ability of capturing wind energy is strong, which may easily cause the rotating speed of the wind turbine to accelerate. Therefore, the yaw system is enabled to resume performing the next crosswind operation along the current unwinding direction, so as to prevent the wind turbine from causing a run-away failure due to the acceleration of the rotating speed. In the following, considering that the yaw system may continuously receive other yaw instructions during performance of a crosswind operation, in order to avoid a conflict of instruction execution and successfully prevent a run-away failure, the control method for avoiding a wind turbine run-away in embodiments of the present disclosure may further include the following contents.

In an alternative embodiment, if the yaw system receives other automatic yaw instructions that are not related to a crosswind operation during the current crosswind process, the other automatic yaw instructions that are not related to the crosswind operation is disabled, and the yaw system is controlled to continue to perform a current crosswind operation.

Other yaw instructions that are not related to a crosswind operation may include: a windward yaw instruction, an unwinding yaw instruction and a lubrication yaw instruction, which are common operation instructions in the field of wind power generation.

In an alternative embodiment, if the yaw system receives a manual yaw instruction during the current crosswind process, the current crosswind operation is terminated, and the yaw system is controlled to perform the next crosswind operation based on the manual yaw instruction.

Herein, the manual yaw instruction is a manual local yaw instruction or a remote yaw instruction, and the difference between them is in that the sender is different.

Figure 4:
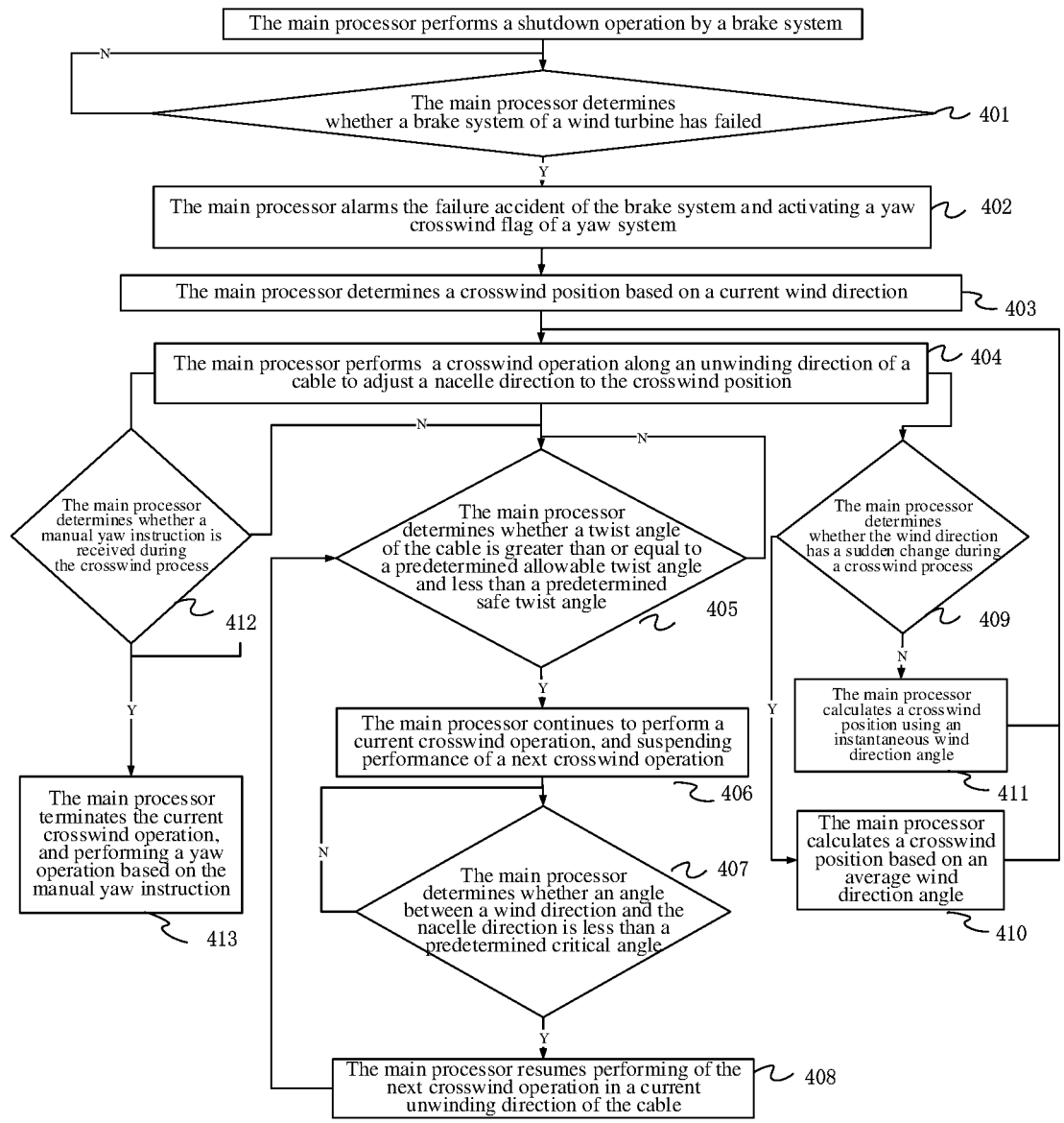
FIG. 4 is a schematic flow chart of a control method for avoiding a wind turbine run-away according to yet another embodiment of the present disclosure.

FIG. 4 is a schematic flow chart of a control method for avoiding a wind turbine run-away according to yet another embodiment of the present disclosure, which is used to illustrate the control method for avoiding a wind turbine run-away in embodiments of the present disclosure in detail by means of an example. As shown in FIG. 4, the control method for avoiding a wind turbine run-away in this example may include steps 401 to 413.

In step 401, whether a brake system of the wind turbine has failed or not is determined. If the brake system of the wind turbine has failed, then the method may proceed to step 402, and if the brake system of the wind turbine has not failed, then the method may return back to step 401.

In step 402, the failure accident of the brake system is alarmed and a yaw crosswind flag of a yaw system is activated. The alarm information and the activation information of the yaw crosswind flag is uploaded to a remote monitoring system.

In step 403, a crosswind position is determined based on a current wind direction.

In step 404, a crosswind operation is performed along an unwinding direction of a cable to adjust a nacelle direction to the crosswind position.

In step 405, whether a twist angle of the cable is greater than or equal to a predetermined allowable twist angle and less than a predetermined safe twist angle is determined. If the twist angle of the cable is greater than or equal to the predetermined allowable twist angle and less than the predetermined safe twist angle, then the method may proceed to step 406, otherwise, the method may return back to step 405.

In step 406, performance of a current crosswind operation is continued, and performance of a next crosswind operation is suspended.

In step 407, whether an angle between a wind direction and the nacelle direction is less than a predetermined critical angle is determined. If the angle between the wind direction and the nacelle direction is less than the predetermined critical angle, then the method may proceed to step 408, and if the angle between the wind direction and the nacelle direction is not less than the predetermined critical angle, then the method may return back to step 407.

In step 408, performance of the next crosswind operation is resumed in a current unwinding direction of the cable.

In step 409, whether the wind direction has a sudden change or not during a crosswind process is determined. If the wind direction has a sudden change during the crosswind process, then the method may proceed to step 410, and if the wind direction does not have a sudden change during the crosswind process, then the method may proceed to step 411.

In step 410, a crosswind position is calculated based on an average wind direction angle, and then the method may turn to step 404.

In step 411, a crosswind position is calculated using an instantaneous wind direction angle, and then the method may turn to step 404.

In step 412, whether a manual yaw instruction is received during the crosswind process is determined. If a manual yaw instruction is received during the crosswind process, then the method may proceed to step 413, and if no manual yaw instruction is received during the crosswind process, then the method may return back to step 405.

In step 413, the current crosswind operation is terminated, and a yaw operation is performed based on the manual yaw instruction.

Figure 5:
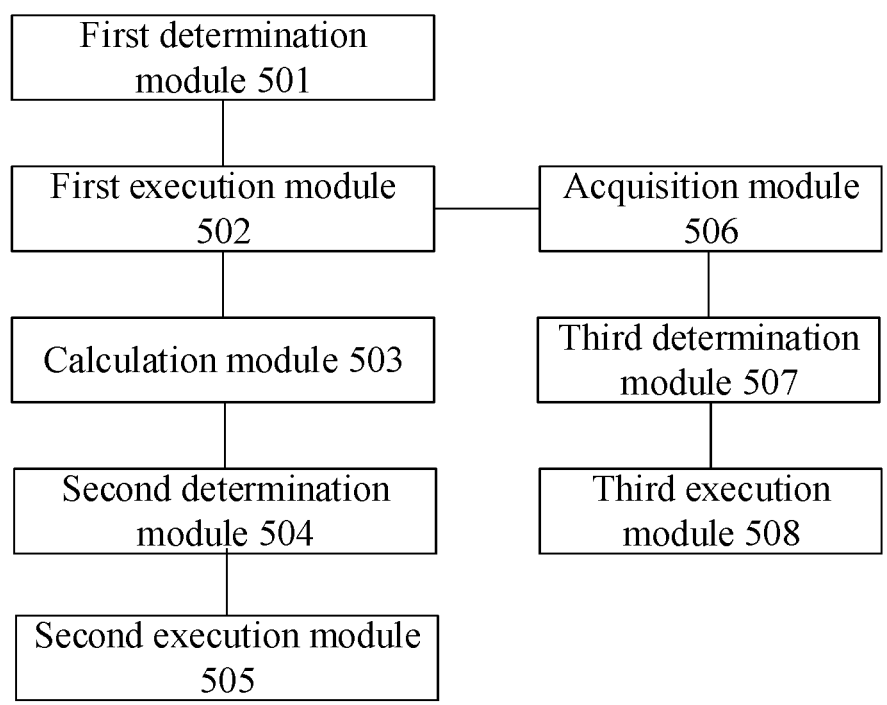
FIG. 5 is a schematic structural diagram of a control device for avoiding a wind turbine run-away according to an embodiment of the present disclosure.

FIG. 5 is a schematic structural diagram of a control device for avoiding a wind turbine run-away according to an embodiment of the present disclosure. As shown in FIG. 5, the control device for avoiding a wind turbine run-away may include a first determination module 501, a first execution module 502, a calculation module 503, a second determination module 504 and a second execution module 505.

The first determination module 501 is configured to determine whether a brake system of the wind turbine has failed or not.

The first execution module 502 is configured to: if the brake system has failed, calculate an initial crosswind position based on a current wind direction angle, and enable a yaw system of the wind turbine to perform a crosswind operation based on the initial crosswind position.

In an alternative embodiment, the first execution module 502 may include an acquisition unit and an execution unit. The acquisition unit is configured to obtain an unwinding direction of a cable. The execution unit is configured to enable the yaw system to perform the crosswind operation along the unwinding direction to adjust a nacelle direction to the initial crosswind position.

The calculation module 503 is configured to: perform a long-period filter processing on wind direction data acquired during a crosswind process to obtain an average wind direction angle, and perform a short-period filter processing on the wind direction data to obtain an instantaneous wind direction angle.

The second determination module 504 is configured to determine whether a wind direction has a sudden change or not based on the average wind direction angle and the instantaneous wind direction angle.

In an alternative embodiment, the second determination module 504 may include a calculation unit and a determination unit. The calculation unit is configured to calculate a difference between the average wind direction angle and the instantaneous wind direction angle. The determination unit is configured to determine that the wind direction has a sudden change if the difference is greater than a preset threshold.

The second execution module 505 is configured to: if the wind direction has a sudden change, calculate a new crosswind position based on the average wind direction angle, and enable the yaw system to perform a crosswind operation based on the new crosswind position.

In an alternative embodiment, as shown in FIG. 5, the control device for avoiding a wind turbine run-away may further include an acquisition module 506, a third determination module 507 and a third execution module 508.

The acquisition module 506 is configured to obtain a twist angle of the cable during a current crosswind process.

The third determination module 507 is configured to determine whether the twist angle is greater than or equal to a predetermined allowable twist angle and less than a predetermined safe twist angle.

The third execution module 508 is configured to: if the twist angle is greater than or equal to the predetermined allowable twist angle and less than the predetermined safe twist angle, suspend performance of a next crosswind operation after the current crosswind process ends, and enable the yaw system to resume performing the next crosswind operation along the unwinding direction of the cable when an angle between a current wind direction and the nacelle direction becomes less than a predetermined critical angle.

It should be noted that, the control device for avoiding a wind turbine run-away described above is integrated into a main controller of the wind turbine, or is a component capable of performing logic operation independently, and there is no limit herein in this aspect.

Embodiments of the present disclosure may also provide a wind turbine, which may include the control device for avoiding a wind turbine run-away described above.

It should also be noted that, functional blocks shown in structure diagrams described above is implemented as hardware, software, firmware, or a combination thereof. When implemented in hardware, it can be, for example, an electronic circuit, an application specific integrated circuit (ASIC), suitable firmware, a plug-in, a function card, and the like. When implemented in software, elements in embodiments of the present disclosure is a program or a code segment that can be used to perform a required task. The program or code segment is stored in a machine-readable medium, or is transmitted over a transmission medium or communication link through a data signal carried in a carrier. A "machine-readable medium" may include any medium capable of storing or transferring information. Examples of a machine-readable medium may include an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and the like. The code segment is downloaded via a computer network such as the Internet, an intranet, and the like.

The foregoing description are only some specific embodiments of the present disclosure, however, the scope of the present disclosure is not limited thereto, and within the technical scope disclosed in the present disclosure, any person skilled in the art can easily devise of changes or substitutions that should be covered by the scope of the present disclosure. Therefore, the scope of the present disclosure should be defined by the scope of the following claims.

What is claimed is:

1. A control method for avoiding a wind turbine run-away, comprising:
   determining whether a brake system of the wind turbine has failed or not;
   if the brake system has failed, calculating an initial crosswind position based on a current wind direction angle, and enabling a yaw system of the wind turbine to perform a crosswind operation based on the initial crosswind position;
   performing a long-period filter processing on wind direction data acquired during a crosswind process to obtain an average wind direction angle, and performing a short-period filter processing on the wind direction data to obtain an instantaneous wind direction angle;
   determining whether a wind direction has a sudden change or not based on the average wind direction angle and the instantaneous wind direction angle; and
   if the wind direction has the sudden change, calculating a new crosswind position based on the average wind direction angle, and enabling the yaw system to perform a crosswind operation based on the new crosswind position.

2. The method of claim 1, wherein the determining whether the wind direction has a sudden change based on the average wind direction angle and the instantaneous wind direction angle comprises:
   calculating a difference between the average wind direction angle and the instantaneous wind direction angle; and
   determining that the wind direction has the sudden change if the difference is greater than a preset threshold.

3. The method of claim 1, wherein a cable is disposed in a cabinet of a nacelle of the wind turbine, and the enabling the yaw system of the wind turbine to perform a crosswind operation based on the initial crosswind position comprises:
   acquiring an unwinding direction of the cable; and
   enabling the yaw system to perform the crosswind operation along the unwinding direction to adjust a direction of the nacelle to the initial crosswind position.

4. The method of claim 3, wherein the method further comprises:
   acquiring a twist angle of the cable during a current crosswind process;
   determining whether the twist angle is greater than or equal to a predetermined allowable twist angle and less than a predetermined safe twist angle;
   if the twist angle is greater than or equal to the predetermined allowable twist angle and less than the predetermined safe twist angle, suspending performance of a next crosswind operation after the current crosswind process ends, and enabling the yaw system to resume performing the next crosswind operation along the unwinding direction of the cable when an angle between a current wind direction and the direction of the nacelle becomes less than a predetermined critical angle.

5. The method of claim 1, wherein the determining whether the brake system of the wind turbine has failed or not comprises:
   determining whether the brake system brakes at least two blades to a corresponding predetermined position within a first predetermined time period after receiving a shutdown instruction, and
   determining that the brake system has failed, if the brake system fails to brake the at least two blades to the corresponding predetermined position within the first predetermined time period after receiving the shutdown instruction; or
   determining whether the brake system reduces a rotating speed of the wind turbine to a predetermined rotating speed within a second predetermined time period after receiving the shutdown instruction, and
   determining that the brake system has failed, if the brake system fails to reduce the rotating speed of the wind turbine to the predetermined rotating speed within the second predetermined time period after receiving the shutdown instruction.

6. The method of claim 1, wherein the method further comprises:
   if the yaw system receives other automatic yaw instructions that are not related to a crosswind operation during a current crosswind process, disabling the other automatic yaw instructions that are not related to the crosswind operation, and controlling the yaw system to continue to perform a current crosswind operation;
   if the yaw system receives a manual yaw instruction during the current crosswind process, terminating the current crosswind operation, and controlling the yaw system to perform a next crosswind operation based on the manual yaw instruction.

7. A control device for avoiding a wind turbine run-away, comprising:
   a processor; and a memory for storing instructions executable by the processor;

wherein the processor is configured to:

determine whether a brake system of the wind turbine has failed or not;

if the brake system has failed, calculate an initial crosswind position based on a current wind direction angle, and enable a yaw system of the wind turbine to perform a crosswind operation based on the initial crosswind position;

perform a long-period filter processing on wind direction data acquired during a crosswind process to obtain an average wind direction angle, and perform a short-period filter processing on the wind direction data to obtain an instantaneous wind direction angle;

determine whether a wind direction has a sudden change or not based on the average wind direction angle and the instantaneous wind direction angle; and if the wind direction has the sudden change, calculate a new crosswind position based on the average wind direction angle, and enable the yaw system to perform a crosswind operation based on the new crosswind position.

8. The device of claim 7, wherein the processor is further configured to:

calculate a difference between the average wind direction angle and the instantaneous wind direction angle;

determine that the wind direction has the sudden change if the difference is greater than a preset threshold.

9. The device of claim 7, wherein a cable is disposed in a cabinet of a nacelle of the wind turbine, and the processor is further configured to:

acquire an unwinding direction of the cable;

enable the yaw system to perform the crosswind operation along the unwinding direction to adjust a direction of the nacelle to the initial crosswind position.

10. The device of claim 9, wherein the processor is further configured to:

acquire a twist angle of the cable during a current crosswind process;

determine whether the twist angle is greater than or equal to a predetermined allowable twist angle and less than a predetermined safe twist angle;

if the twist angle is greater than or equal to the predetermined allowable twist angle and less than the predetermined safe twist angle, suspend performance of a next crosswind operation after the current crosswind process ends, and enable the yaw system to resume performing the next crosswind operation along the unwinding direction of the cable when an angle between a current wind direction and the direction of the nacelle becomes less than a predetermined critical angle.

11. The device of claim 10, wherein the device is integrated into a main controller of the wind turbine.

12. A wind turbine comprising the control device for avoiding a wind turbine run-away according to claim 7.

* * * * *